(12) United States Patent
Kaiserman et al.

(10) Patent No.: US 7,594,442 B2
(45) Date of Patent: Sep. 29, 2009

(54) RESISTANCE VARYING SENSOR USING ELECTRICALLY CONDUCTIVE COATED MATERIALS

(75) Inventors: Terrance Kaiserman, Loxahatchee, FL (US); Keith Margolin, West Palm Beach, FL (US); John Gentile, Montclair, NJ (US); Juan Bravo, Wingvale, NY (US); Vitus Yung, Hong Kong (CN)

(73) Assignee: T-Ink TC Corp, West Palm Beach, FL (US)

(\*) Notice: Subject to any disclaimer, the term of this patent is extended or adjusted under 35 U.S.C. 154(b) by 57 days.

(21) Appl. No.: 11/581,701

(22) Filed: Oct. 16, 2006

(65) Prior Publication Data

US 2007/0084293 A1    Apr. 19, 2007

Related U.S. Application Data

(60) Provisional application No. 60/726,545, filed on Oct. 14, 2005.

(51) Int. Cl.
*G01B 7/16* (2006.01)
(52) U.S. Cl. ............................................ 73/763; 73/760
(58) Field of Classification Search ............ 73/760–856
See application file for complete search history.

(56) References Cited

U.S. PATENT DOCUMENTS

| | | | |
|---|---|---|---|
| 2,445,660 A | 7/1948 | Brustle | |
| 4,028,276 A | 6/1977 | Harden et al. | |
| 4,210,895 A | 7/1980 | Sado et al. | |
| 4,295,699 A | 10/1981 | DuRocher | |
| 4,419,653 A | 12/1983 | Waigand et al. | |
| 4,794,365 A | 12/1988 | Dunbar et al. | |
| 4,845,323 A | 7/1989 | Beggs | |
| 4,876,419 A | 10/1989 | Lodini et al. | |
| 4,878,107 A | 10/1989 | Hopper | |
| 5,060,527 A | 10/1991 | Burgess | |
| 5,089,325 A * | 2/1992 | Covey | 442/231 |
| 5,371,326 A | 12/1994 | Clearwaters-Dreager et al. | |
| 5,429,006 A * | 7/1995 | Tamori | 73/862.046 |
| 5,578,765 A | 11/1996 | Franz | |
| 5,583,303 A | 12/1996 | Franz | |
| 5,727,549 A * | 3/1998 | Suda et al. | 600/393 |
| 5,948,990 A | 9/1999 | Hashida et al. | |
| 5,955,936 A * | 9/1999 | Shaw et al. | 338/22 R |
| 5,962,118 A | 10/1999 | Burgess | |
| 5,989,700 A | 11/1999 | Krivopal | |

(Continued)

OTHER PUBLICATIONS

International Search Report for International Application No. PCT/US06/40716 dated Aug. 29, 2007 (4 pages).

(Continued)

*Primary Examiner*—Max Noori
(74) *Attorney, Agent, or Firm*—Douglas Sharrott; George Teacherson

(57) ABSTRACT

In accordance with one embodiment, a sensor includes a fibrous region contacting at least two electrodes. The fibrous region has an electrically conductive coating. The fibrous region has a resistance and when the fibrous region is compressed, the resistance changes. In another embodiment, a method of making a pressure responsive sensor includes providing a compressible material, applying a conductive coating to the compressible material to provide a coated compressible material having a resistance, and placing the coated compressible material in contact with at least two electrodes, wherein when the compressible material is compressed, the resistance changes.

20 Claims, 13 Drawing Sheets

U.S. PATENT DOCUMENTS

| | | |
|---|---|---|
| 6,114,645 A * | 9/2000 | Burgess ............... 200/512 |
| 6,121,870 A | 9/2000 | Ariga et al. |
| 6,291,568 B1 | 9/2001 | Lussey et al. |
| 6,429,668 B1 | 8/2002 | Billen et al. |
| 6,495,069 B1 | 12/2002 | Lussey et al. |
| 6,642,467 B2 | 11/2003 | Farringdon |
| 6,646,540 B1 | 11/2003 | Lussey et al. |
| 6,661,239 B1 | 12/2003 | Ozick |
| 6,696,653 B1 | 2/2004 | Smith et al. |
| 6,781,817 B2 * | 8/2004 | Andelman ............ 361/503 |
| 6,824,912 B2 * | 11/2004 | Yamaura et al. ........ 429/41 |
| 6,858,811 B2 | 2/2005 | Fitzgerald et al. |
| 6,871,395 B2 | 3/2005 | Scher et al. |
| 6,940,291 B1 | 9/2005 | Ozick |
| 7,049,559 B2 | 5/2006 | Ishii et al. |
| 7,054,133 B2 | 5/2006 | Orth |
| 2002/0180578 A1 | 12/2002 | Sandbach |
| 2004/0144635 A1 | 7/2004 | Fitzgerald et al. |
| 2004/0154911 A1 * | 8/2004 | Burgess et al. ......... 200/512 |

OTHER PUBLICATIONS

Written Opinion of the International Searching Authority for International Application No. PCT/US06/40716 dated Aug. 29, 2007 (4 pages).

* cited by examiner

RESISTANCE VARYING SENSOR USING ELECTRICALLY CONDUCTIVE COATED MATERIALS

RELATED APPLICATION

This application claims the benefit of U.S. Provisional Application Ser. No. 60/726,545, titled "Pressure Responsive Article," filed on Oct. 14, 2005, the contents of which are hereby incorporated by reference in its entirety.

FIELD

The present disclosure relates generally to pressure responsive electrical sensors, and more particularly, concerns pressure responsive articles which may serve as an electrical pressure sensor and/or a pressure responsive switch.

BACKGROUND

Pressure responsive electrical switches are known in the art. One known switch includes a deformable insulating material, such as silicone rubber, in which electrically conductive metal particles are suspended. The particles are dispersed in the body so that the body is essentially non-conductive when not compressed. However, when the body is compressed, particles are brought into engagement, increasing the conductivity of the body. Thus, if the body is provided between two electrical terminals, it will serve as an open switch (non-conductive) in the absence of a compressive force and a closed switch (conductive) when a compressive force is applied.

Despite prior efforts to provide such pressure responsive electrical sensors, known sensors exhibit a number of shortcomings. For example, the sensors are limited in the range of pressures they will detect. Furthermore, when applied to a fabric article, such as a pillow, they suffer from the disadvantage that the sensor may be felt in the article. Additionally, the sensors do not increase in measured resistance when compressed.

SUMMARY

In accordance with one embodiment, a sensor includes a fibrous region contacting at least two electrodes. The fibrous region has an electrically conductive coating. The fibrous region has a resistance and when the fibrous region is compressed, the resistance changes.

In another embodiment, a sensor includes a compressible material having a resistance and two electrodes. Compression of the compressible material causes the resistance of the compressible material to increase. Additionally, the electrodes are in electrical communication with the compressible material when the compressible material is compressed.

In another embodiment, a sensor includes a compressible material having a resistance and two electrodes printed on a substrate. When the compressible material is compressed, the resistance of the compressible material changes. The electrodes are in electrical communication with the compressible material.

In another embodiment, a method of making a pressure responsive sensor includes providing a compressible material, applying a conductive coating to the compressible material to provide a coated compressible material having a resistance, and placing the coated compressible material in contact with at least two electrodes, wherein when the compressible material is compressed, the resistance changes.

BRIEF DESCRIPTION OF THE DRAWINGS

The foregoing brief description, as well as further objects, features and advantages of the present invention will be understood more completely from the following detailed description of presently preferred embodiments, with reference being had to the accompanying drawings in which.

DETAILED DESCRIPTION

Figure 1:
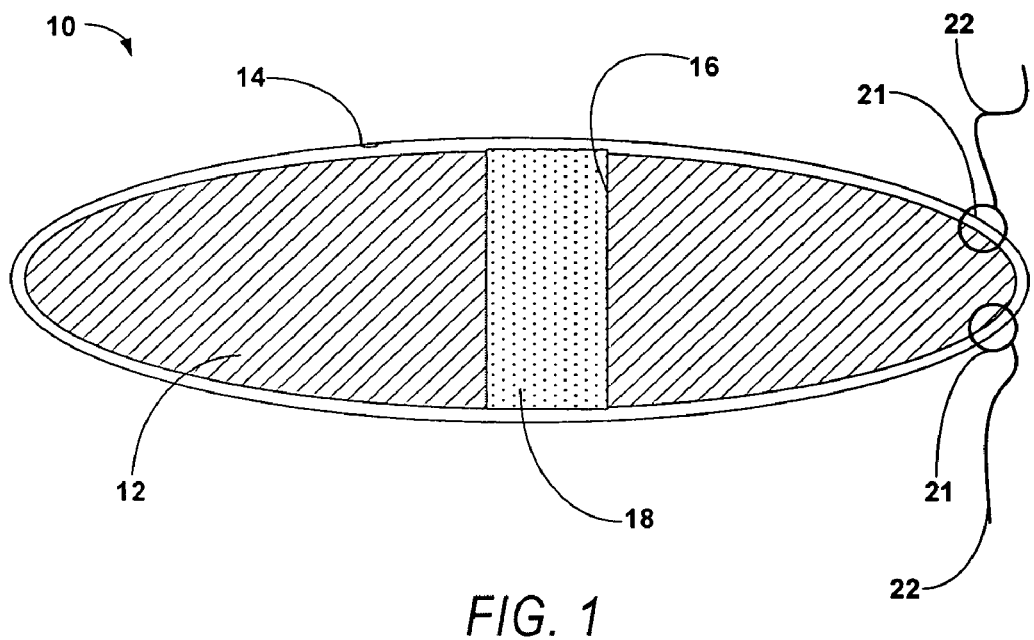
FIG. 1 is a side-sectional view taken through a cushion 10 of an embodiment.

Set forth below are various embodiments of pressure responsive sensors and switches. The sensor and switch embodiments are illustrated by depicting their use in a variety of applications. However, it is understood that the switches, switching elements, and switching circuits described herein are not to be limited to the particular embodiments described. For example, the disclosed switches may be useful for automotive occupancy sensors, bed and bedding sensors, pillow sensors etc. Nevertheless, the switches, switching circuits and switching elements may be used in a variety of applications other than those that are specifically described, including but not limited to a wide variety of pressure switches, strain gauges, weight sensors, automotive switches, consumer electronics (e.g., cameras and music players), or controls generally.

The switch embodiments described herein comprise conductive compressible materials. In general, compressible materials may include, but are not limited to, fibers, fiber-fill, tufted material, textiles, foams, foam rubber, or sponge material. As discussed in detail below, the compressible conductive materials described herein may be manufactured by a variety of processes. In one embodiment, they are coated with or impregnated with a conductive coating such as an ink. In another embodiment, the compressible conductive materials are inherently conductive. Another embodiment the compressible material is made conductive by the addition of conductive fillers.

Foams are polymeric materials with a dispersed gas or air phase contained in them. The dispersed phase is contained in a number of cells defined within the foam. Foams may be characterized as open-cell or closed-cell foams. In an open-cell foam, the cells are connected to and in fluid communication with one another, whereas in a closed-cell foam, the cells are isolated from and not in fluid communication with one another. Examples of foams which may be used in the compressive conductive materials described herein include but are not limited to urethane, ethylene vinyl acetate, expanded polyethylene, polyurethane, polytetrafluoroethylene, polypropylene, polyvinylidene fluoride, vinyl acetate, polyvinyl acetate, polychloroprene, polystyrene, linear low density polyethylene, polyolefin, polyether, and nitrocellulose ester foams. Sponge materials may include, for example, natural sponge, synthetic sponge, and sponge rubber.

In another embodiment, the compressible conductive materials comprise a fiberfill. Fiberfills generally include but are not limited to textured yarn, quilt batting, polyethylene terephthalate (PET), organic cotton, foam, broadcloth, nylon, heirloom, yarn, polyfil, cotton, filament, glass, cardboard, and fibermesh fiberfills. Some examples of commercially available fiberfills include Flojet-15® (an ePTFE Fiber available from Albany International of Albany, N.Y.), Telar® (a continuous fine denier filament from Fiber Technology Corp. of Lorton, Va.), Dacron® (a polyester fiber from Invista of Wichita, Kans.), Thinsulate® (a micro fiber blend polyolefin & polyester from 3M of St. Paul, Minn.), and Kodel® two ounce (2 oz.) fiberfill (from Eastman Kodak Co. of Rochester, N.Y.).

As discussed herein, fiberfill is a filling material used for cushions, pillows, bedding, apparel, and other applications. The bulk of the fiberfill includes fibers loosely arranged (e.g., loose, unordered, tufted, or not generally bonded together). The individual fibers may comprise monofilaments or intertwined filaments. When inserted into the interior of an article such as a pillow, comforter, cushion, etc., the fibers provide support and form. Voids or interstices between individual fibers allow the mass to be compressed (i.e., reduced in volume) when a compressive force is applied. The fibers preferably have a stiffness that enables the fiberfill mass to return to a relaxed volume when the compressive force is removed.

Fiberfills generally differ from woven or non-woven textiles in their form and compressibility. A fiberfill is generally more compressible than a textile. In the embodiments described herein, the fiberfills have an uncompressed to fully compressed volume ratio of at least about 1.5:1. However, a ratio of about 5:1 is preferred. Moreover, a woven or non-woven textile has a highly ordered appearance to the fibers that make up the textile. While both foams and fiberfills are compressible, fiberfills lack the integral structure and generally defined shape of foams.

As mentioned above, certain of the pressure responsive sensors described herein comprise a conductive coating. A conductive coating typically comprises a resin, a vehicle, and a conductive material. Conductive materials include, but are not limited to conductive granules of silver, copper, zinc, nickel, aluminum, stainless steel, graphite, iron, carbon, carbon nanotubes, conductive polymers, and nano versions of silver, gold, platinum, and/or palladium. The resins may be any type of resins typically used for surface coatings, such as acrylamide, acrylics, phenolics, bisphenol A type epoxy, shellac, carboxymethylcellulose, cellulose acetate butyrate, cellulosics, chlorinated polyether, chlorinated rubber, epoxy esters, ethylene vinyl acetate copolymers, maleics, melamine, natural resins, nitrocellulose solutions, isocyanates, hydrogenated resin, polyamide, polycarbonate, rosins, polyesters, polyethylene, polyolefins, polypropylene, polystyrene, polyurethane, polyvinyl acetate, silicone, vinyls and water thinned resins. The selected resins may be either water soluble or soluble in an organic solvent-based system. Alternatively, the resin may be dispersible in a suitable liquid, rather than truly soluble therein. A liquid dispersion medium may be used in which the resin is dispersed, but in which other materials are truly dissolved. The resin may be used with or without crosslinking. If crosslinking is desired, it may be obtained by using a crosslinking agent or by application of heat or radiation (e.g., infrared, electron beam (EB), or ultraviolet radiation (UV)) to the composition.

As indicated above, the resin may be dissolved or dispersed in various liquids that serve as a vehicle for carrying the resin to facilitate its application to fiber or foam. The vehicle may be water based, water miscible, water dispersible, or two-part. The vehicle may also be solvent based, plastisol based, etc. Specific conductive compositions that are suitable for use in the embodiments described below are those described in U.S. Pat. Nos. 5,626,948 and 5,455,749, the entire contents of which are incorporated by reference herein.

As explained below with respect to FIG. 14, an example of a conductive coating (a silver-based polymer thick film ink) suitable for coating the foams and fiberfills described herein is Electrodag 820B (available from Acheson Colloids of Port Huron, Mich.) and is known to adhere to polyester (which is a preferred fiberfill material). Where the coating is to be applied in a dipping or spraying operation, it typically includes suitable amounts of solvent (thinner) to ensure that it is fully distributed in the desired areas of the compressible material. Fast drying thinners are especially preferred for dipping and spraying operations. Another exemplary conductive coating comprises about 30 percent to about 60 percent of a urethane dispersion, about 30 percent to about 60 percent silver powder, about one (1) percent defoamer, and about 20 percent to about 30 percent silver flakes (all percentages by weight). A preferred example of a washable, water-based silver ink coating comprises about 29.8 percent of a Zeneca R972 urethane dispersion, about one (1) percent of a C. J. Patterson, Patcoat 841 Defoamer, about 45.2 percent of IIRP Metals D3 Silver powder, and about 24 percent of Techniks 135 silver flakes (all percentages by weight). A coating is prepared for application by mixing about one (1) part conductive coating with about three (3) parts water for the water-based solution. Water is added until the viscosity is about one thousand centipoise (1000 cp) or less. This allows the coating to flow around and through the fibers as well as allowing for spraying.

With respect to embodiments including a compressible material that is inherently conductive, the term "inherently conductive" is used to indicate that the material itself (e.g., the foam or fiberfill) is conductive, as opposed to a material which is formed first and then treated or coated with a conductive constituent. Inherently conductive materials include a conductive component that is incorporated during the process of making or forming the material. In certain embodiments, they also include fibers or foams whose chemical composition and/or structure imparts electrical conductivity.

A compressible material impregnated with a conductive filler is a fiberfill, foam, or sponge that further includes a conductive powder or small conductive fibers that are added to a fiberfill, foam, or sponge to make the filler conductive. A conductive component is added to a non-conductive compressible material. The non-conductive fiberfill, foam, or sponge is already produced and the conductive components are then deposited within. The conductive components may be inherently conductive fibers, fibers coated with a conductive substance, metal fibers, metal powder, carbon powder, carbon fibers, etc.

Turning now to the drawings, FIG. 1 is a side-sectional view taken through a cushion 10. The cushion has a filling 12 which may be foam or rubber, down, or any other conventional filling material. The cushion is enclosed within a cover 14, which may be fabric. The cushion has an interior space 16 which is open at the top and bottom and is filled with a conductive compressive material, which in the embodiment of FIG. 1 is fiberfill 18. Interior space 16 is broadly a pouch (e.g., a container) that holds fiberfill 18. As described in greater detail below, fiberfill 18 may be inherently conductive, or it may comprise a conductive coating or filler.

Figure 2:
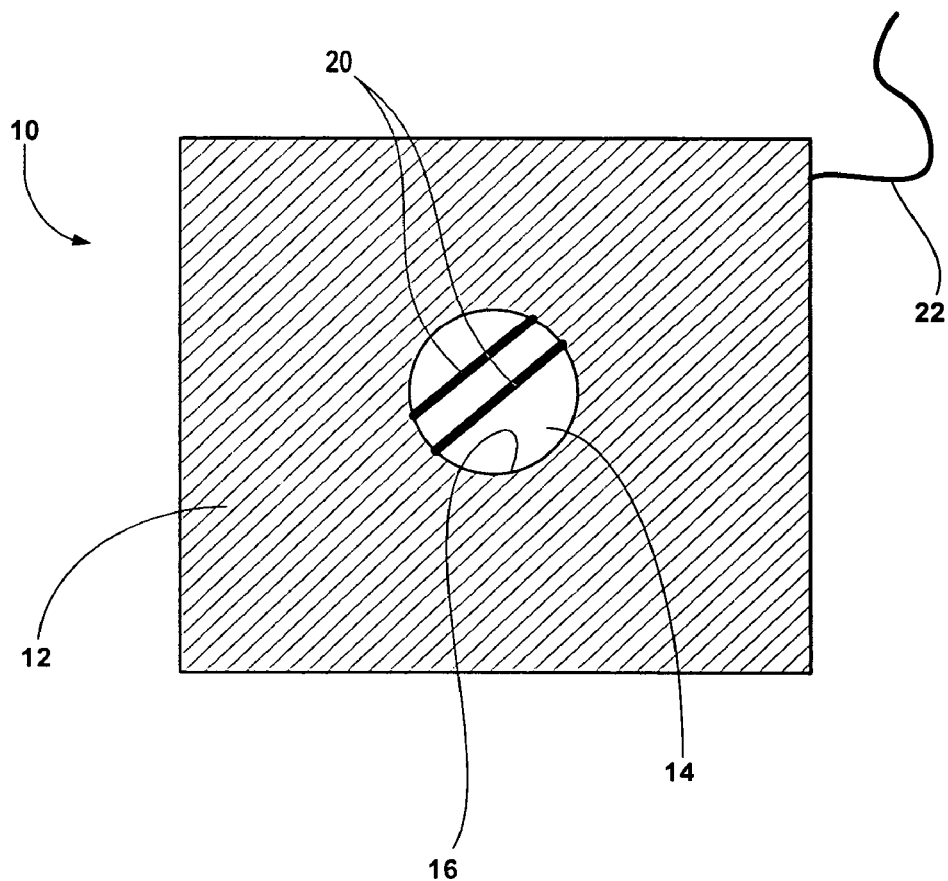
FIG. 2 is a top sectional view of the cushion with the fiberfill material removed.
Figure 2A:
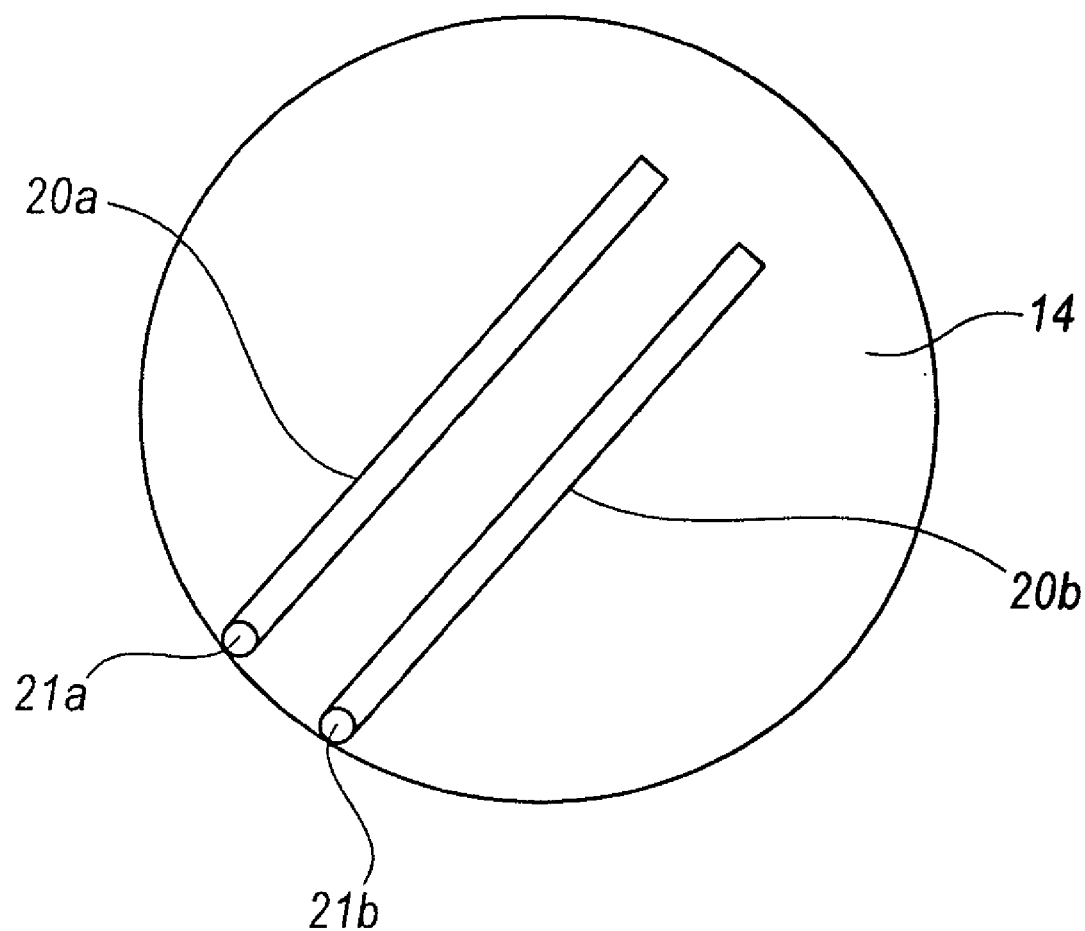
FIG. 2A is a top plan view of a cushion surface having electrodes printed thereon.

FIG. 2 is a top sectional view of the cushion 10 with the conductive fiberfill material 18 removed. Because the fiberfill material 18 is removed, the inner surface of the bottom portion of cover 14 is visible in the view of FIG. 2. As may be seen, the interior surface of cover 14 is formed with a pair of electrically conductive traces 20, 20 which face into the space 16. Preferably, conductive traces 20, 20 are formed by introducing them on cover 14, as by printing, and both traces 20, 20 are formed on the same surface of cover 14 in a single printing operation. In another embodiment, the top and bottom portions of cover 14 each include a single trace 20. Assembly includes sewing the edges of covers 14 together with each other and stuffing fiberfill material 18 between each of covers 14. The resistance of fiberfill material 18 is measured between the two opposing single traces 20. However, conductive traces 20a, 20b may also be printed on opposing covers (e.g., on different covers 14 and on opposite side of fiberfill material 18). Conductive traces 20a, 20b (as shown in FIG. 2A below) may also both be printed on opposite covers 14. That is to say, each side of fiberfill 18 may be in contact with a set of conductive traces 20a, 20b.

Printing processes that may be used with respect to the embodiments described herein include, but are not limited to, screen printing, off-set printing, gravure printing, flexographic printing, pad printing, intaglio printing, letter press printing, ink jet printing, and bubble jet printing. The ink is preferably selected to be compatible with the substrate and the printing process. Depending on the process selected, relatively high viscosity pastes may be used, as well as liquid inks having a viscosity of five thousand centipoise (5000 cp) (Brookfield viscosity) or less. High viscosity pastes are well-suited for screen printing processes while lower viscosity inks are better suited for processes such as gravure and flexographic printing. Depending on the specific printing process and substrate, shear thinning ink such as pseudoplastic or thixotropic inks may be used, as well as dilatent or shear thickening inks.

Conductive traces 20, 20, as mentioned above, are preferably formed on cover 14 by printing methods. In selecting a printing method and conductive ink, the substrate material should be taken into account. Cover 14 may comprise a wide variety of substrate materials, including plastics, spun and non-spun fabrics, woven fabrics, non-woven fabrics, knit fabrics, foams or combinations thereof. Cover 14 may also comprise natural and synthetic materials or fibers, and water proof and non water proof materials.

Each of snap connectors 21, 21 (of a type which is commonly found in garments) is provided on the surface of article 10 and is electrically connected to traces 20, 20, respectively. Although not shown, it will be understood that the opposing cover 14 also includes conductive traces 20, 20, which are electrically connected to the other of snap connectors 21, 21. Snap connectors 21, 21, connect to separate electrical wires 22, 22 and provide electrical connections to cushion 10 and traces 20, 20 at opposite ends of space 16.

FIG. 2A shows an alternative and preferred embodiment of cushion 10 of FIG. 1, wherein electrode traces 20a, 20b are disposed in a non-opposing relationship to one another on cover 14. In the embodiment of FIG. 2A, traces 20a, 20b are disposed on the same surface of cover 14. By placing both traces 20a, 20b on the same substrate, i.e. cover 14, the number of printing operations is reduced. Moreover, by placing them in a non-opposing relationship, traces 20a, 20b may both be located on a side of cushion 14 which is away from the user (e.g., traces 20a, 20b are on a side of article 10 opposite from the user) or faces away from the user. For example, traces 20a, 20b may be located on the bottom side of an automotive seat. Thus, the user would not be able to detect the presence of traces 20a, 20b.

Conductive fiberfill material 18 has an uncompressed or relaxed state and a compressed state. In its uncompressed state, conductive fiberfill material 18 has a resistance that substantially prevents electric current from flowing from trace 20a to trace 20b, e.g. about ten meg-ohms (10 MΩ). As conductive fiberfill material 18 is compressed, traces 20a, 20b remain spaced apart at a substantially fixed distance. The resistance of conductive fiberfill material 18 decreases, causing an electric current to flow from trace 20a, through fiberfill material 18, and to trace 20b with a fiberfill resistance detectably lower than when in a relaxed state, e.g. about ten kilo-ohms (10 kΩ). In an alternative embodiment, fiberfill material 18 has an uncompressed state resistance of five meg-ohms (5 MΩ), an intermediate compressed state (e.g., one-half of full compression) resistance of two and one half meg-ohms (2.5 MΩ), and a fully compressed resistance of one kilo-ohm (1 kΩ).

Figure 5:
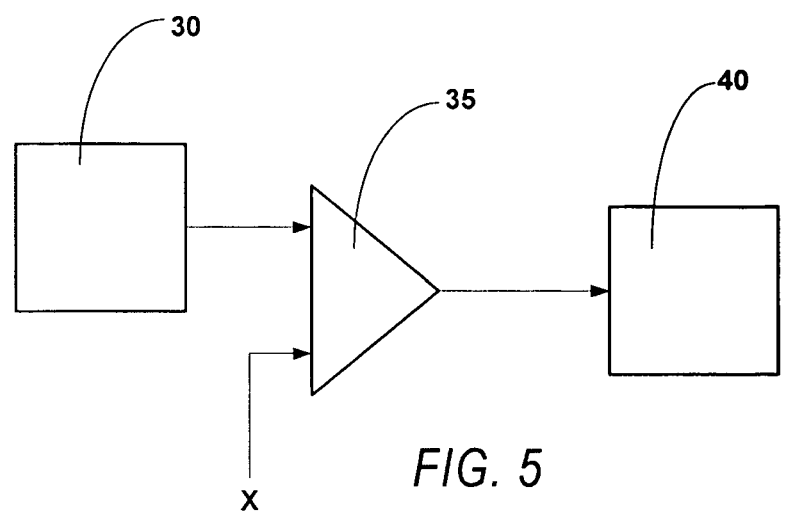
FIG. 5 is an electrical schematic diagram of sensing circuitry for a pressure sensor.

As explained below in detail with respect to FIG. 5, the resistance of conductive fiberfill material 18 may be used to trigger a signal when a predetermined resistance is reached (e.g., due to compression of conductive fiberfill material 18). A trigger threshold may be adjusted by determining a value for an input resistor that is in series with conductive fiberfill material 18. For example, the input resistor value may be predetermined through experimentation or calculation where the trigger threshold is at half compression of conductive fiberfill material 18. The input resistor value may also be determined based on the characteristics of conductive fiberfill material 18, such as whether silver or carbon particles are used to provide conductance, or based on density of fiberfill is used. Moreover, the input resistor may be chosen based on environmental conditions such as the presence (or possibility of presence) of moisture or humidity.

Alternatively, conductive fiberfill material 18 may have a mid-range resistance in a relaxed state such as about fifty kilo-ohms (50 kΩ). When compressed, the resistance may reduce to a level such as about 10 kilo-ohms (10 kΩ). The resistance ranges provided are not limiting and are merely exemplary. It should be appreciated that the useful range of resistances from a relaxed state and compressed state is dependant upon the environment as well as the capability of the resistance measuring circuitry employed. In another embodiment, when using a silver-based conductive constituent, fiberfill material 18 has a resistance of about one milliohm (1 mΩ) when compressed.

Figure 3:
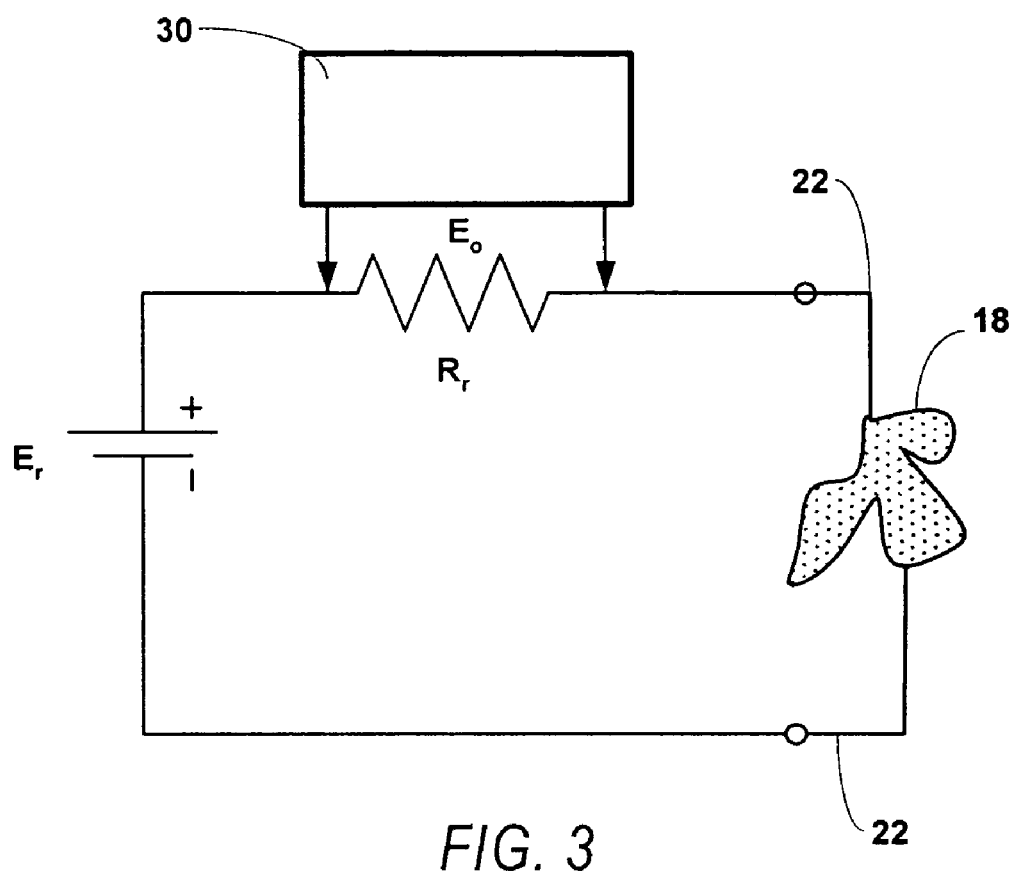
FIG. 3 is an electrical schematic diagram illustrating how the resistance of fiberfill material 18 may be determined.

The pressure responsive sensor embodiments described herein may be used to indicate a switching event based on the resistance of the sensor. FIG. 3 is an electrical schematic diagram illustrating how the resistance of fiberfill material 18 may be determined in accordance with an embodiment. A reference voltage $E_r$ is in series circuit with a reference resistor $R_r$. A voltage sensor 30, such as a voltmeter, is connected across resistor $R_r$ to sense the voltage $E_o$ across it and the resistance $R_s$ of the fiberfill material 18 can be determined from equation 1.

$$R_s = [E_r/E_o 31\ 1] \times R_r \qquad (1)$$

Where:
$R_s$ is the resistance of the fiberfill material 18,
$E_r$ is the reference voltage,
$E_o$ is the voltage across reference resistor $R_r$, and
$R_r$ is the value of the reference resistor.

Figure 4:
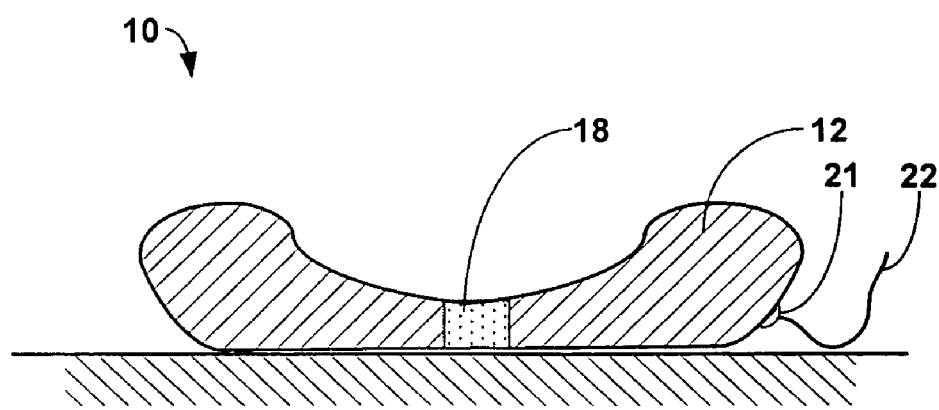
FIG. 4 is a sectional side view, similar to FIG. 1, showing the cushion 10 in a compressed state.

FIG. 4 is a sectional side view, similar to FIG. 1, showing the cushion 10 in a compressed state. In the embodiment of FIG. 4, the compressible conductive material comprises a conductive fiberfill material 18. As indicated above, fiberfill 18 may be inherently conductive, may include a conductive coating, or may include a conductive filler.

In its expanded state (see FIG. 1), the fibers of conductive fiberfill material 18 will be spaced apart from one another at a maximum spacing (i.e., the maximum spacing is determined by the maximum expansion of fiberfill 18 or the volume of the interior space 16 along with the amount of fiberfill 18 packed therein). Thus, in a relaxed state, cushion 10 will assume a minimally conductive condition in which the resistance $R_s$ is maximized. Compressing cushion 10 (compare FIG. 4 and FIG. 1) will cause the fibers of conductive fiberfill material 18 into closer proximity, increasing the conductivity of conductive fiberfill material 18 and decreasing the resistance $R_s$.

As mentioned above, in one embodiment a conductive fiberfill is provided by applying a coating to an otherwise non-conductive fiberfill material. In this embodiment, the coating covers the outside surface of the fiber strands. The resin component of the coating adheres to the surface of the fibers, binding the conductive particles (e.g., silver, nickel, carbon) to the fibers. Due to the contact between adjacent fibers, one or more continuous conductive paths are defined through or around the fiberfill mass. Because the fiberfill necessarily includes voids, the fiberfill mass is generally less conductive in its relaxed or uncompressed state than in a compressed state. When the fiberfill mass, such as conductive fiberfill material 18, is compressed the voids are reduced in size, causing more coated fibers to touch each other. The increased fiber-to-fiber contact increases the number of conductive paths through and around the fiberfill mass, causing it to become more conductive (and less resistive) overall. The resistance is measured at electrodes or conductive traces (see conductive traces 20a, 20b of FIG. 2A) that contact conductive fiberfill material 18, typically at an exterior surface of conductive fiberfill material 18.

It should be appreciated that the change in resistance $R_s$ can be used to perform a useful function. For example, if cushion 10 were a pillow with a sleeping user resting his head on it, the increased resistance when the user lifts his head could be used to turn on a light in his bedroom. Similarly, if cushion 10 or another conductive compressive article were provided in the seat of a motor vehicle, it could be used to detect the presence and/or the weight of the driver and use that information to adjust vehicle settings (e.g., the seat or mirror positions) based on the presence or weight of the driver.

One of the advantages of using a compressible conductive material, such as conductive fiberfill 18, as a pressure responsive sensor is that, owing to the use of conductive coatings, fillers or inherently conductive fiberfill, the sensor is substantially undetectable. A user resting his head on the cushion 10 or sitting on it could not detect the presence of a pressure responsive sensor. Similarly, the user could not detect the presence of the sensor by handling cushion 10 if the wire leads 22, 22 were hidden or if a wireless connection were provided. Moreover, by providing resistance sensing electrodes as printed traces the possibility of detection is minimized. The presence of the sensor apparatus is even less detectable if the electrodes are disposed on a surface facing away from the user, as illustrated in the embodiment of FIG. 2A.

The pressure responsive articles described herein can be used with a variety of switching and sensing circuitry. As shown in the electrical schematic diagram of FIG. 5, sensor 30 provides an output voltage to a voltage comparator 35 which compares the outputs of voltage sensor 30 with a reference value X. Should the output of voltage sensor 30 have a certain relationship to the reference value X (above or below, depending upon the application), comparator 35 would trigger an output 40. In one embodiment, output 40 may be an infrared transmitter, the signal of which could be sensed remotely. In another embodiment, the output 40 is a discrete output that may turn on a light or signal an electronic control unit (ECU) such as in a vehicle.

For vehicle safety in particular, a vehicle seat detector may use a single pressure sensor, multiple pressure sensors, or a sensing matrix for determining occupant position (e.g., leaning to the front, side, or back) and weight. An ECU may take information from the pressure sensors directly by reading a resistance value, or indirectly from a vehicle communication message to provide more refined control based on the occupant information (e.g., occupant position, size, and weight). In an embodiment, the pressure sensor or sensors may be used to tailor the operation of safety systems including, but not limited to, front airbags, side airbags, air curtains, seat belt pretensioners, pyrotechnic tensioners, pyrotechnic crash pulse adjustment, various precrash devices including, but not limited to, such as brakes and steering, data recorders (e.g. a black box), and various post crash devices including, but not limited to, information transmitters, seat and belt adjusters, steering wheel and seat position adjusters, etc.

With respect to airbags, a determination as to whether an airbag should be fired may be made based on the occupant's weight and position, as well as an indication that there is no occupant for a particular seat. Moreover, the airbag deployment parameters may be tuned for the particular occupant detected. In one embodiment, the rate of fill for an airbag may be adjusted using occupant information. In another embodiment, the shape of the airbag in deployment may be adjusted using occupant information.

In an especially preferred embodiment, the compressible conductive materials described herein comprise a fiberfill material. An advantage of using a fiberfill material as a conductive compressible fiberfill material 18 in a pressure responsive sensor is that an extremely large range of pressures may be sensed. In comparison to sensors which are made of a solid, somewhat compressible material, tufted materials experience a much larger change in volume, from a fluffy, tufted state to a tightly compacted state. As mentioned previously, the fiberfills used in the embodiments described herein generally have an uncompressed to fully compressed volume ratio of at least about 1.5:1, with a ratio of at least about 5:1 being preferred. As a result, tufted materials can exhibit a much larger range of values for resistance $R_s$.

For example, it would not be unusual for the fiberfill material comprising conductive compressible fiberfill material 18 to exhibit a resistance range with a ratio of about 10,000:1. The corresponding range of pressures would be determined by the compression characteristics of cushioning material 12 contained in cushion 10. Thus, it should be possible to sense a wide range of pressures in different pressure classes by selecting an appropriate material. Pressure sensing may be used, for example, to detect the mass of a vehicle occupant and enhance safety equipment (e.g., adjusting airbag deployment parameters using the seat occupant's mass).

In another embodiment, cushion 10 may include multiple layers of fiberfill. Each layer may have the same or different electrical properties as well as compressive or resilient properties. That is to say, each layer may exhibit a different resistance value when compressed. The resistance values may correspond to different weights applied. For example, a fifty pound (50 lb) weight may trigger the first layer, whereas a five hundred pounds (500 lb) weight may trigger the third layer. Moreover, the force required to compress each layer to a predetermined resistance may be different depending upon the type of compressible material used (e.g., foam or fiberfill), the characteristics of the compressible material (e.g., density), or the conductive constituent (e.g., silver or carbon). In this way, detection of weight and position are tuned for an application.

In addition to weight sensing, the multi-tiered embodiments may be used to determine the breadth (e.g., the seating surface area) of a passenger. For example, the seat may be subdivided laterally into three regions. The center region is most likely to be subject to the most significant weight. The side regions are subject to more or less weight depending upon the width or breadth of the passenger or the seated position (e.g., the passenger is seated as shifted left or shifted right). In this way, both the weight and the breadth of the passenger can be estimated to tailor the operation of safety systems.

When used in sensitive or demanding roles (e.g., automotive applications), the pressure sensors preferably include individual calibration to determine their switching points. Such calibration is typically done when the pressure sensors are manufactured, but may also be done at various stages of vehicle assembly or post-production. The calibrations may include a change to the input resistor value in series with the conductive compressible fiberfill material 18, or the calibration may be an entry or entries into a lookup table. Moreover, the lookup table may include a plurality of calibrations for a number of pressures applied to the pressure sensor where a characteristic curve is developed such that values between the calibration points may be interpolated.

It should also be appreciated that the previously described fabric article or cushion 10 can be washed and handled in essentially the same manner as a conventional fabric article without diminishing or otherwise effecting the operation of the pressure responsive sensor.

In one embodiment, compressible conductive material such as fiberfill 18 is formed by applying an electrically conductive coating to an otherwise non-conductive compressible material. As mentioned previously, the coating includes a resin component having conductive particles dispersed in it. The resin adheres to the compressible material, thereby binding the conductive particles to it. In one exemplary embodiment, a conductive coating known as Electrodag 820B (available from Acheson Colloids of Port Huron, Mich.) is diluted with a fast-drying thinner that is appropriate for the resin system, in a ratio of about one (1) part coating to about three (3) parts thinner. The fiberfill is permitted to soak in the mixture for about five (5) to about ten (10) minutes and is then post-cured, preferably by thermal curing. However, depending on the resin, other curing processes such as chemical curing, electron beam, or ultraviolet (UV) curing may be used. After it is cured, the now conductive fiberfill is introduced without appreciable compression into space 16 of cushion 10. For a more detailed description of an exemplary coating process, see FIG. 14.

Figure 6:
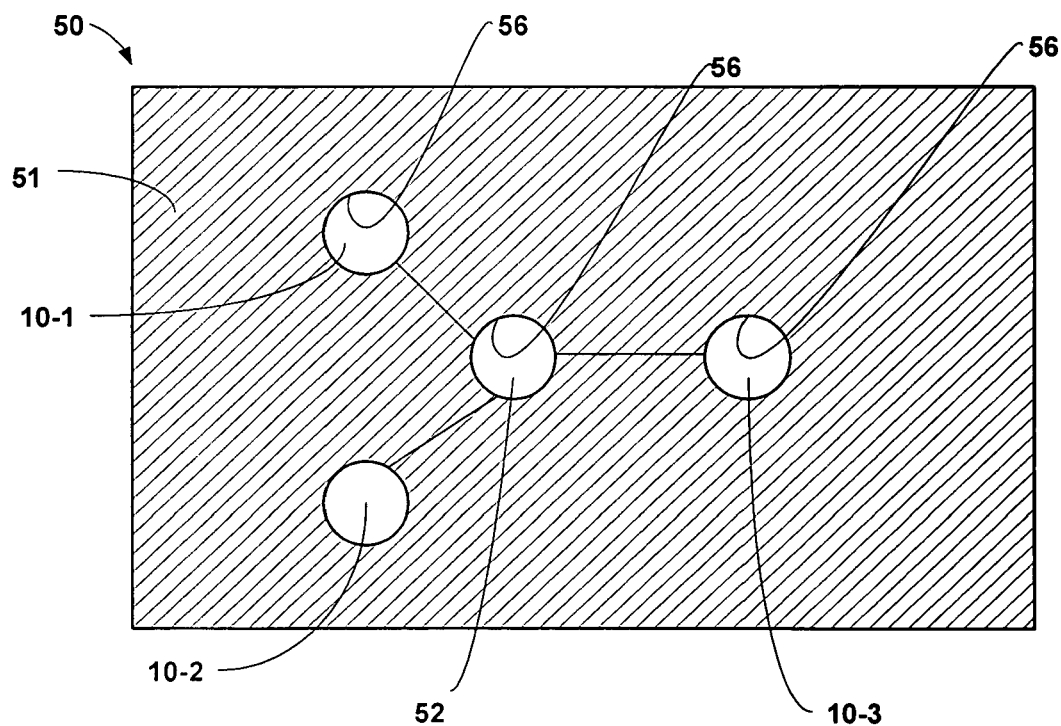
FIG. 6 is a top sectional view of a comforter embodiment.

The pressure responsive sensors described herein may be incorporated into a number of different articles. As illustrated in FIG. 6, in one embodiment pressure responsive sensors may be incorporated into a comforter to perform a variety of sensing and/or switching tasks. FIG. 6 is a top sectional view of a comforter 50. The padding 51 of comforter 50 is provided with three cut-out spaces 56, 56, 56 into which are fitted three cushions 10-1, 10-2, and 10-3. Cushions 10-1, 10-2, and 10-3 comprise a covering and contain a compressible conductive material of the type already described. In an exemplary embodiment, cushions 10-1, 10-2, and 10-3 have covers (not shown) with empty interiors. The covers define pouches for containing fiberfill 18. Thus, the covers act as retaining structures that impart structural definition and integrity to the fiberfill 18 contained in them.

The covers (not shown) of cushions 10-1, 10-2, and 10-3 is preferably constructed of a textile that is pleasant to a user. The interior of the outer casing may be printed, sprayed, or otherwise coated with a moisture/liquid-resistant barrier or moisture/liquid-impervious lamination, coating, or cover, to avoid water penetration into the inner space where fiberfill 18 is contained. It is especially preferred to provide an electrically insulative covering that will substantially prevent liquids from contacting fiberfill 18 so that the performance of fiberfill 18 is maintained. The fiberfill performance characteristics reduced by moisture or water intrusion include the electrical properties, as well as the ability to return to a relaxed volume when a compressive force is removed. For example, a spill may occur where comforter 50 is used near liquids. Where the outer casing of cushions 10-1, 10-2, and 10-3 are liquid resistant, the liquid will not substantially penetrate cushions 10-1, 10-2, and 10-3 and damage fiberfill 18. In another example, a pouch containing fiberfill may be washable because the pouch is made liquid-proof by lamination or coating. In this case, a switch including a conductive compressible fiberfill is intended to be used in harsh environments, including washing, and will operate under those conditions. Although a variety of known moisture barriers may be used, an exemplary moisture barrier film is the polyurethane film sold as Product No. 3220 by the Bemis Company of Shirley, Mass.

Cushions 10-1, 10-2, and 10-3 are connected to a connection pod 52 which is provided with snap connectors 54 (not shown) to permit connection of a harness (not shown) connecting pod 52 to a control box (not shown). With comforter 50, a user may actuate any of the cushions 10-1, 10-2, 10-3 through the use of pressure, as already explained. Through programming of the control box, the different cushions may provide alternative actuation points, or they may actuate different functions. For examples, cushions 10-1, 10-2 and 10-2 could be used to turn lights on or off or to turn a television set or entertainment center on or off.

Figure 7:
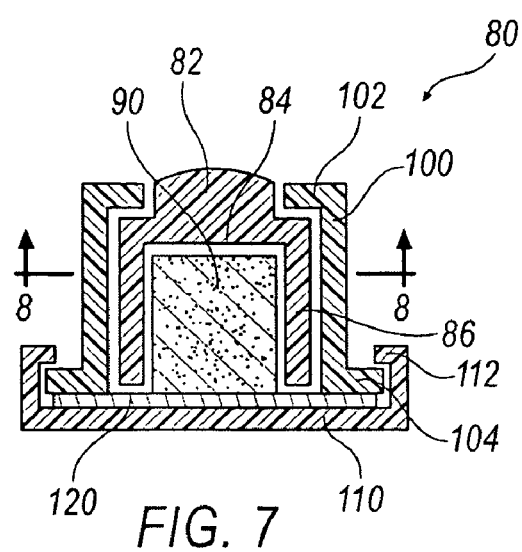
FIG. 7 is a side cross-sectional view of a pressure-sensitive switch according to an embodiment.
Figure 8:
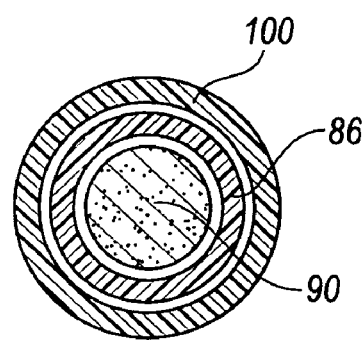
FIG. 8 is a cross-sectional view of the pressure-sensitive switch of FIG. 7 taken along line 8-8.

Referring now to FIGS. 7 and 8, FIG. 7 is a side cross-sectional view of a pressure-sensitive switch 80 according to an embodiment. In FIG. 7, switch 80 is in an uncompressed or relaxed state. FIG. 8 is a cross-sectional view of the pressure-sensitive switch of FIG. 7 taken along line 8-8. Switch 80 includes a domed pushbutton 82, a compressible material 90, a body 100, a back cover 110, and a sensing circuit 120. Pushbutton 82 is the mechanical input for switch 80 and is intended to be depressed by a user or other means (e.g., a lever, or an interference). Pushbutton 80 further includes a hollow generally cylindrical portion 86 and a compression surface 84.

Body 100 is a rigid material, such as plastic, and may be transparent or translucent (explained in detail below with respect to FIG. 10) so as to transmit light, as well as to provide structural stability to switch 80. Body 100 further includes a retainer rim 102 and a lip 104. Compressible material 90 is a resilient material and is preferably a resilient foam of the type described previously.

Compressible material 90 is also preferably conductive. In the embodiment of FIGS. 7-8, switch 80 is a finger-actuated switch which comprises a conductive foam. The conductive foam may be inherently conductive, or it may be a non-conductive foam having a conductive surface coating. It may also include a conductive filler. Where compressible material 90 is inherently conductive or has a conductive filler, the sensing electronics (not shown) detect a button press when the resistance of compressible material 90 decreases. Where compressible material 90 is a non-conductive foam having a conductive surface coating, the sensing electronics (not shown) detects a button press when the resistance of compressible material 90 increases.

In one exemplary embodiment, compressible material 90 comprises an inherently conductive foam such as low density conductive flexible polyurethane foam (available from Conductive Plastics Co. of Media, Pa.). In another exemplary embodiment, compressible material 90 is a foam that is impregnated with a silver-based ink coating of the type described in U.S. Pat. No. 5,636,948 and also described above. In yet another embodiment, compressible material 90 is a non-conductive foam that has a conductive surface coating.

Sensing circuit 120 includes at least two electrodes and is explained in detail below with respect to FIGS. 9A and 9B. Back cover 110 is a snap-on cover to hold together switch 80 and includes snaps 112. When assembled, back cover 110 is pressed towards body 110 and snaps 112 resiliently deflect in a radially outward direction and engage lip 104 to hold switch 80 together. Further, sensing circuit 120 and back cover 110 provide a rigid surface for compressible material 90 to be compressed against when pushbutton 82 is pressed. The resiliency of compressible material 90 provides in part a return feature (e.g., movement back of pushbutton 82 after released) of both compressible material 90 and pushbutton 82. In addition, the dimensions and materials of construction of pushbutton 82 and compressible material 90 are preferably selected to ensure that it substantially returns to its normal state and height after being released from a compressed state. For example, pushbutton 82 may be made from rubber, or a rubber-like material. Moreover, pushbutton 82 preferably exhibits minimal hysteresis.

Figure 9A:
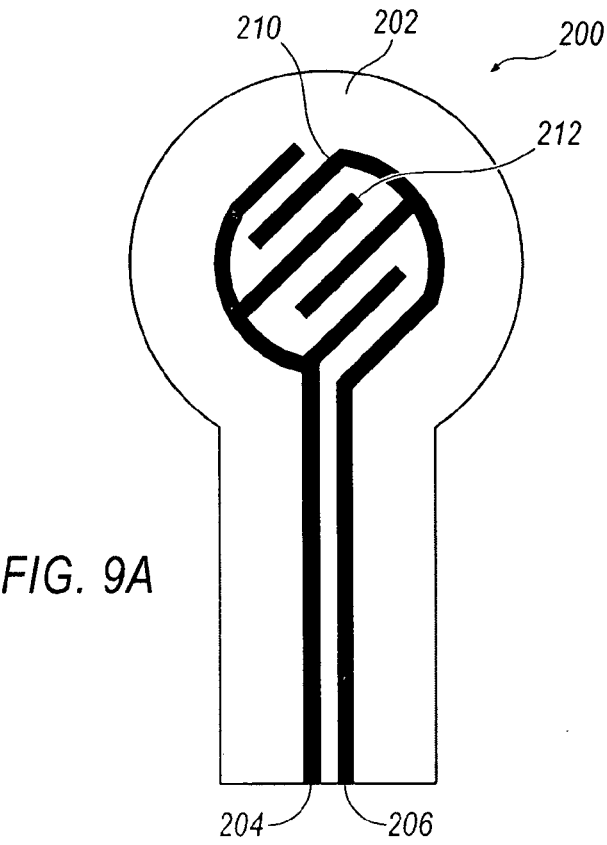
FIG. 9A is a plan view of a circuit layout for switch electrodes for the embodiment of FIG. 7.

FIG. 9A is a plan view of an exemplary circuit layout 200 of sensing circuit 120 for the embodiment of FIG. 7. Circuit layout 200 includes a substrate 202, a first contact 204, a second contact 206, a first electrode pattern 210 and a second electrode pattern 212. First contact 204 and second contact 206 interface switch electronics (explained in detail with respect to FIG. 5). As shown in FIG. 7 (see sensing circuit 120), substrate 202 is placed between back cover 110 and body 100 and electrode patterns 210, 212 are located so as to contact compressible material 90. First electrode pattern 210 and a second electrode pattern 212 are printed on the same surface of substrate 202 and are printed about fifteen millimeters (15 mm) wide and are formed from an ink comprising about 30 percent to about 60 percent of a urethane dispersion, about 30 percent to about 60 percent silver powder, about one (1) percent defoamer, and about 20 percent to about 30 percent silver flakes (all percentages by weight). A preferred example of a washable, water-based silver ink comprises about 29.8 percent of a Zeneca R972 urethane dispersion, about one (1) percent of a C. J. Patterson, Patcoat 841 Defoamer, about 45.2 percent of IIRP Metals D3 Silver powder, and about 24 percent of Techniks 135 silver flakes (all percentages by weight). Electrode patterns 210, 212 are preferably applied to substrate 202 by a printing process of the type described above.

In an alternative embodiment, electrode patterns 210, 212 may also be a carbon-based ink about ten millimeters (10 mm) wide. The carbon-based ink may be an ink comprising from about 30 percent to about 60 percent of a carbon dispersion, from about 30 percent to 60 percent of a urethane dispersion, from about one-half (0.5) percent to about two (2) percent of a thickener flow additive, and from about five (5) percent to about 9 percent of a humectant (all percentages by weight). A preferred embodiment of a washable, carbon-based semi-conductive ink comprises about 49 percent CDI 14644 carbon dispersion, about 42.25 percent Zeneca R-972 Urethane dispersion, about one (1) percent RM-8W Rohm & Haas flow thickener, and about 7.75 percent diethylene glycol humectant (all percentages by weight).

Additionally, electrode patterns 210, 212 may be copper-based ink such as a copper water based ink, product number 599-Z1240 (available from Spraylat Corporation of Mount Vernon, N.Y.). However, copper-based ink may be less desirable for an environment where corrosion and/or oxidation may reduce the performance of electrode patterns 210, 212.

In general, the printed conductive ink compositions for electrodes (e.g. electrode traces 20a, 20b of FIGS. 2, 2A, electrode patterns 210, 212 of FIG. 9A, and contacts 222, 224, 226, 228 of FIG. 9B) may comprise electrically conductive liquids, inks, pastes, powders and/or granules. The conductive inks described herein are similar to the coatings describe above. However, the inks generally include a lesser component, or lack thereof, of the vehicle (e.g., thinner). Generally, the consistency of the ink is tuned for a printing process whereas the coating is formulated to provide a penetrating liquid. As indicated above, the resin may be dissolved or dispersed in various liquids that serve as a vehicle for carrying the resin to facilitate its application to a substrate (e.g., by a printing process). The vehicle may be water based, water miscible, or water dispersible. It may also be solvent based, plastisol based, or two-part based, etc. Specific conductive compositions that are suitable for use in the embodiments described below are those described in U.S. Pat. Nos. 5,626, 948 and 5,455,749.

Figure 9B:
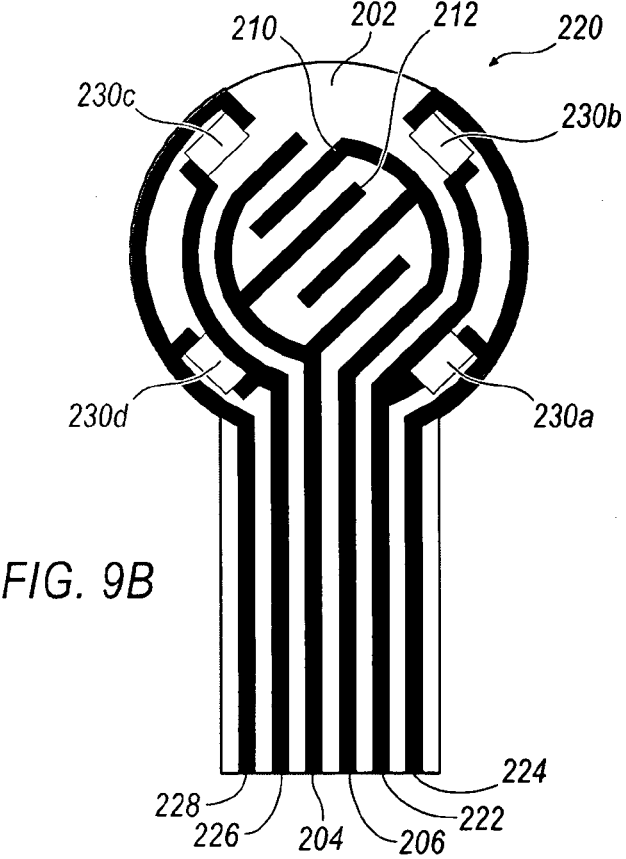
FIG. 9B is a plan view of a circuit layout including illumination elements and switch electrodes for the embodiment of FIG. 7.

FIG. 9B is a plan view of an alternative circuit layout 220, including illumination elements and switch electrodes for sensing circuit 120 of the embodiment of FIG. 7. In addition to the elements of FIG. 9A, layout 220 further includes cathode contacts 222, 226, anode contacts 224, 228, and light emitting diodes (LEDs) 230a, 230b, 230c, 230d. When switch electronics are connected to contacts 204, 206, a lamp driver circuit may further turn on (i.e., activate) LEDs 230a-230d by way of providing a positive voltage to anodes 224, 228, and grounding cathodes 222, 226. By detecting the state of switch 80, the driving circuits may turn LEDs 230a-230d on and off in response to the switched state (e.g., on or off).

Figure 10:
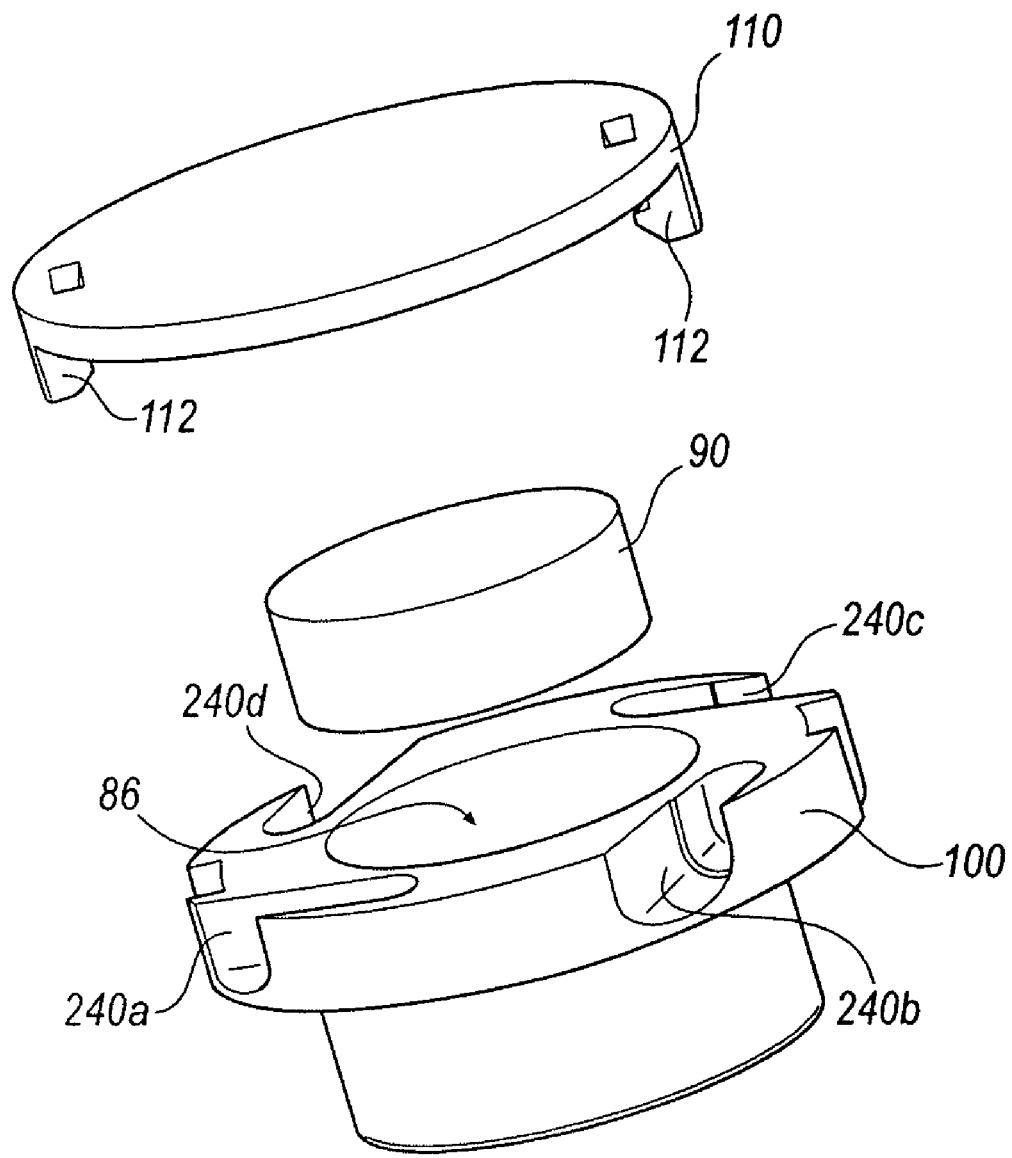
FIG. 10 is an exploded perspective view of the switch of FIG. 7.

FIG. 10 is an exploded perspective view of the switch of FIG. 7. In this embodiment, body 100 includes illumination recesses 240a, 240b, 240c, 240d that are located so as to mate with LEDs 230a-230d of FIG. 9B. Moreover, body 100 is transparent (e.g., clear) and will guide the light (i.e., behave as a transmission channel for the light) from LEDs 230a-230d throughout. During assembly, pushbutton 82 is placed in body 100. Compressible material 90 is placed within pushbutton 82, and sensing circuit 120 (not shown in FIG. 10) is placed between back cover 110 and body 100.

Figure 11:
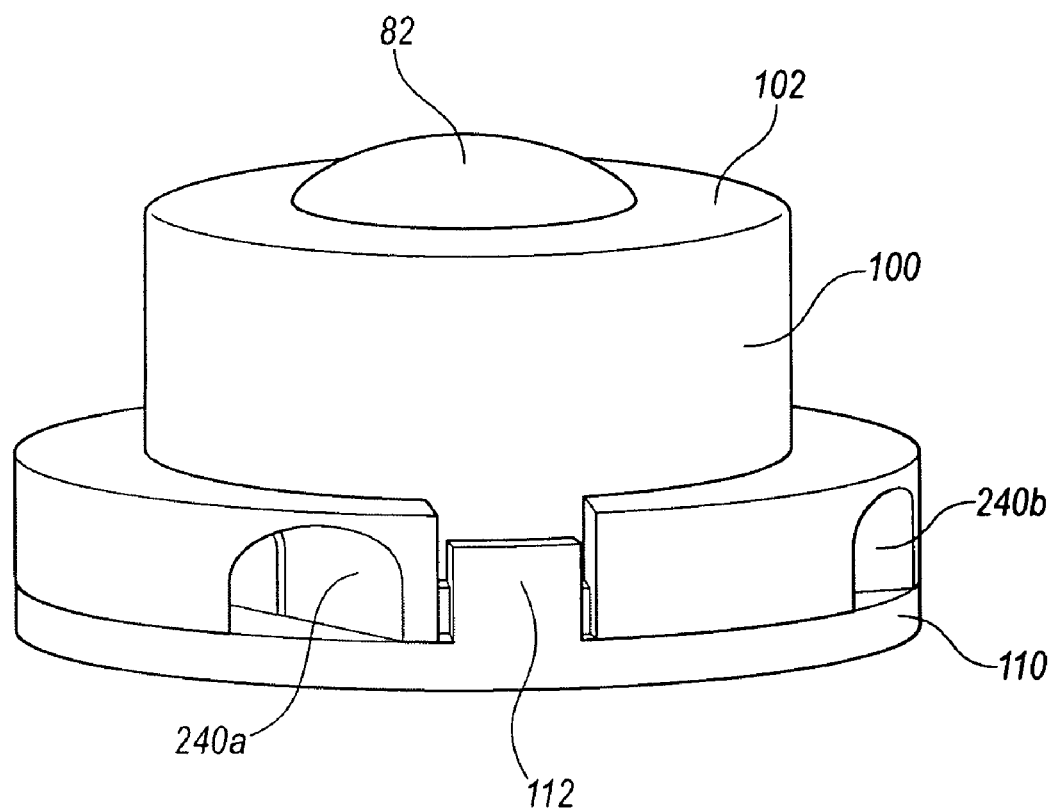
FIG. 11 is a perspective view of the switch of FIG. 7.

FIG. 11 is a perspective view of the switch of FIG. 7 in an assembled state. Domed pushbutton 82 protrudes above retainer rim 102. Body 100 is generally cylindrical and extends down to lip 104 (see FIG. 7). Snap 112 attaches back cover 110 to body 100. As shown, illumination recesses 240a and 240b accept LEDS 230a and 230b (not shown).

Figure 12:
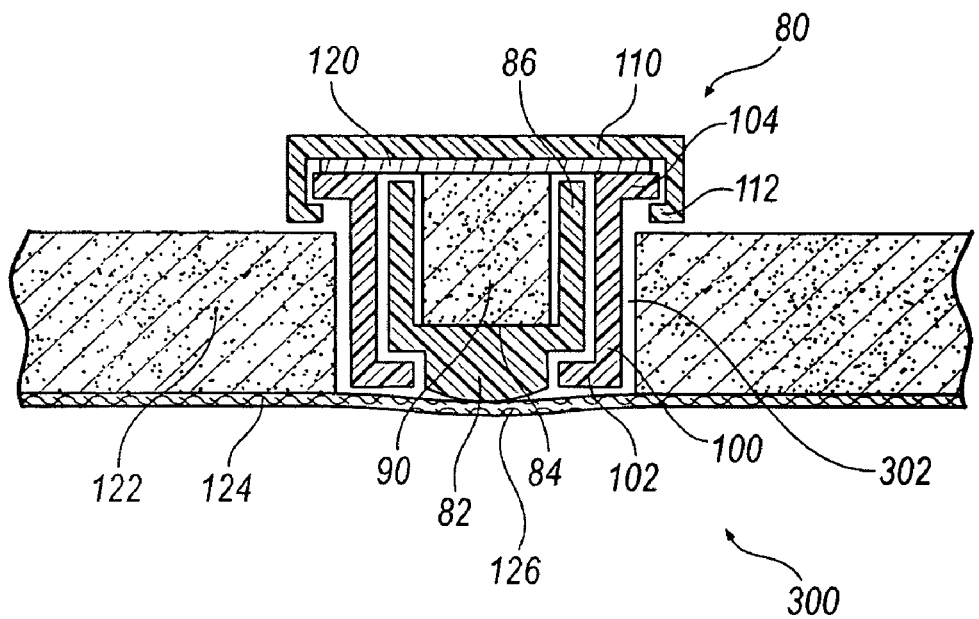
FIG. 12 is a cross-sectional view of a switch of the embodiment in FIG. 7 integrated into an automotive headliner, the switch being in a non-pressed state.

FIG. 12 is a cross-sectional view of a switch of the embodiment in FIG. 7 integrated into an automotive headliner, the switch being in a non-pressed state 300. Although shown and described herein with respect to an automotive environment, the switches described herein are applicable to a variety of other environments and may be used in any location where movement of a compressible material 90 is used to indicate a switching event.

The headliner of FIG. 12 includes a foam layer 122 and a thin fabric layer 124. Switch 80 is placed in a cylindrical space 302 provided through foam layer 122. Retainer rim 102 is preferably substantially flush with the interface of foam layer 122 and fabric layer 124. Because domed pushbutton 82 protrudes beyond retainer rim 102, a bulged portion 126 of fabric layer 124 is present. In an automotive headliner embodiment, back cover 110 is typically placed against a rigid surface such as the inside surface of the vehicle roof. Thus, when a user presses pushbutton 82, compressible material 90 is compressed rather than moving switch 80 as a whole.

Figure 13:
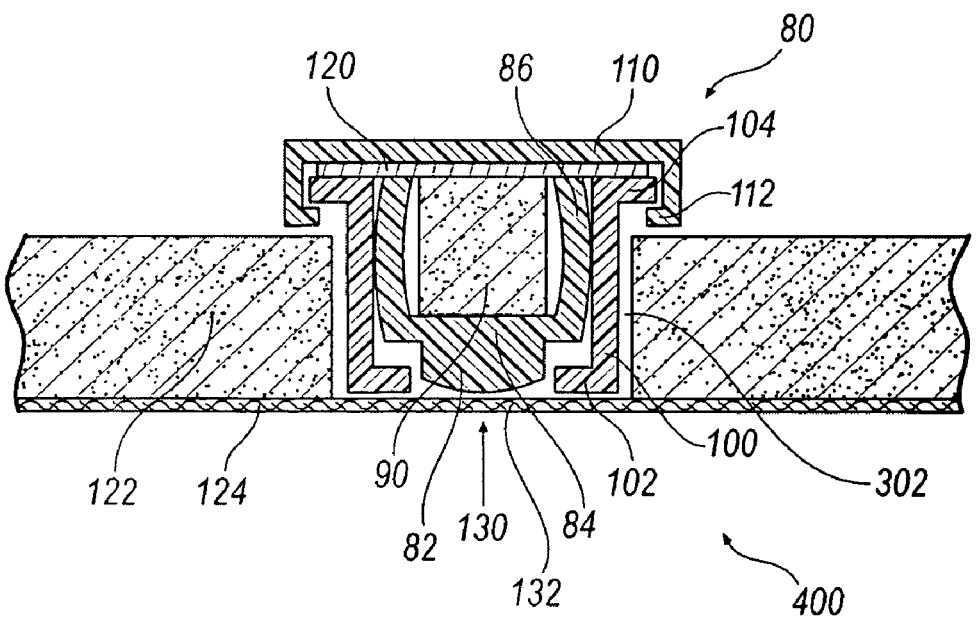
FIG. 13 is a cross-sectional view of a switch of the embodiment in FIG. 7 integrated into an automotive headliner, the switch being in a pressed state.

FIG. 13 is a cross-sectional view of a switch of the embodiment in FIG. 7 integrated into an automotive headliner, the switch being in a pressed state 400. Here, a force 130 presses pushbutton 82 within switch 80 and compresses compressible material 90. Further, pushbutton 82 ensures that compressible material 90 is in pressing contact with electrode patterns 210, 212 (see FIG. 9A). Sensing electronics are connected to first contact 204 and second contact 206 measure the resistance of compressible material 90.

As indicated above, in certain embodiments of the pressure sensitive sensors described herein, the sensor resistance increases upon compression, while in other embodiments it decreases upon compression. In one embodiment, compressible material 90 is a foam material with a conductive surface coating. The conductive surface coating does not penetrate through the thickness of compressible material 90, except perhaps to a small penetration depth. Thus, the conductive path for electrical current flow is substantially along the surface of compressible material 90. As a result of the surface coated configuration, the resistance between electrode patterns 210, 212 will increase upon compression of compressible material 90, as explained below in detail with respect to FIG. 18. Alternatively, when compressible material 90 is, for example, an inherently conductive foam or a foam with a coating that is distributed throughout the thickness of compressible material 90, the resistance between electrode patterns 210, 212 will decrease upon compression of compressible material 90.

Alternatively, where switch 80 includes LEDs 230a-230d, the sensing electronics may switch the LEDs on and off. In that case, body 100 (being a light guide and receiving the light output of LEDs 230a-230d) will guide the light to a visible portion at rim 102 (see FIG. 7) that a user may see. Moreover, where switch 80 is embodied in an automotive headliner application, the light shines through fabric layer 124 and is visible by a passenger.

Switching electronics (see FIG. 5) generally detect a switching event and act accordingly (e.g., turning on a light, setting or resetting an output, adjusting volume, or sending a network message in a vehicle). As shown in FIG. 13, when fully pressed, pushbutton 82 does not travel so far within switch 80 as to cause bulged portion 126 (of FIG. 12) to stretch in an opposite manner. Thus, fully pressed bulged portion 126 (of FIG. 12) becomes generally flat portion 132.

Figure 14:
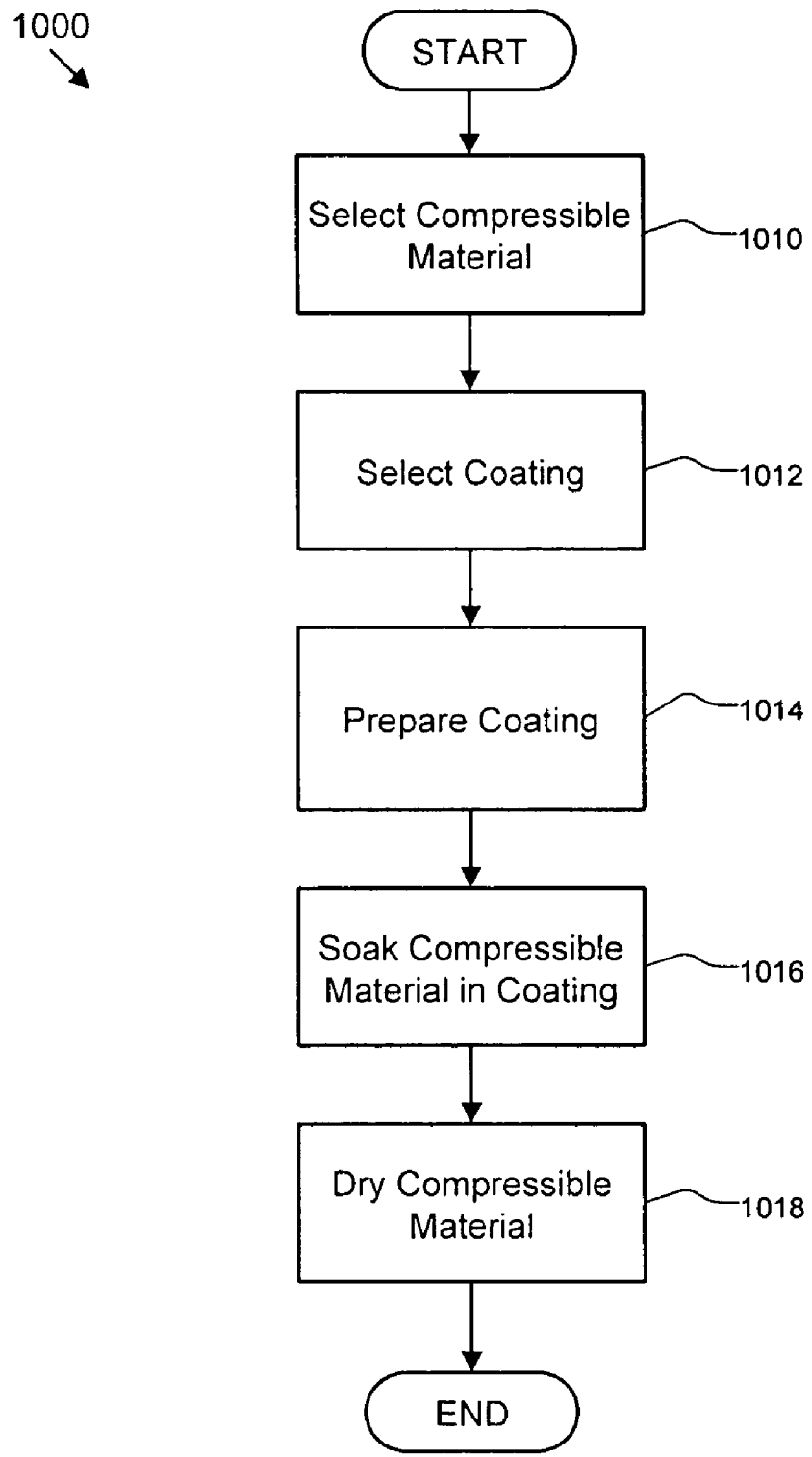
FIG. 14 shows a manufacturing process for coating a compressible material with a conductive ink to make the compressible material conductive.
Figures 15, 16:
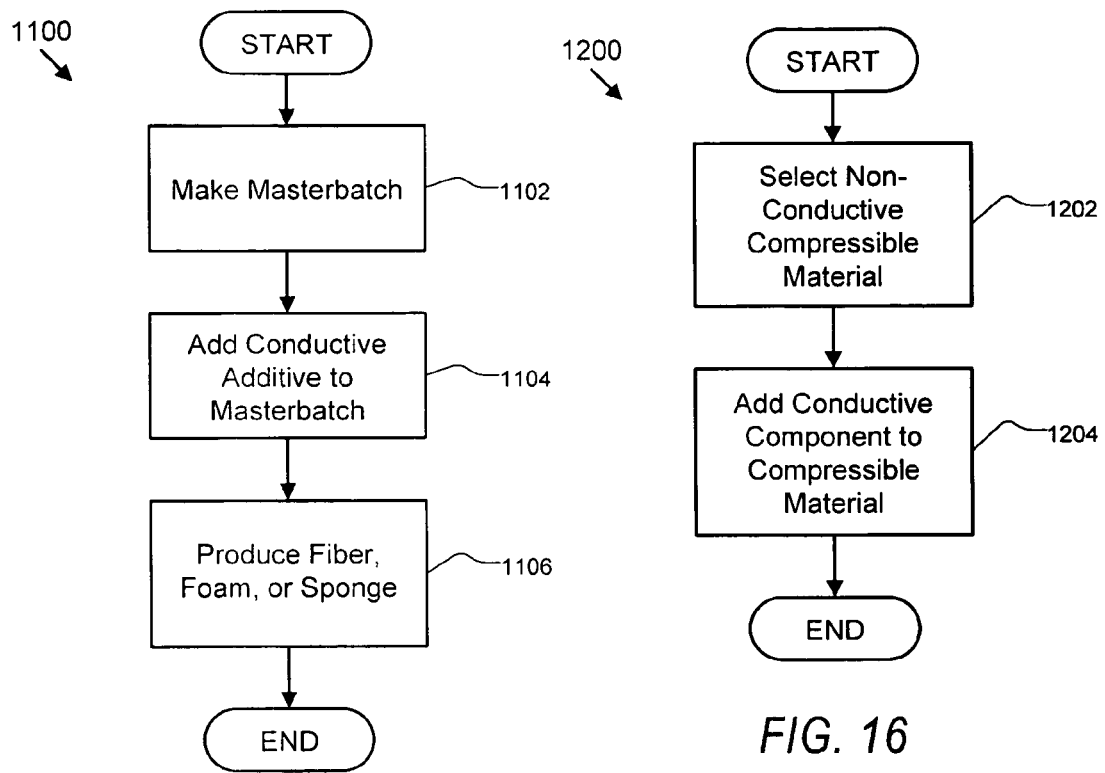
FIG. 15 shows a manufacturing process for making an inherently compressible conductive material where the material itself is conductive.
FIG. 16 shows a manufacturing process for making a conductive impregnated compressible material arrangement where a conductive material is added to a non-conductive compressible material.

In manufacturing the compressible material, e.g. filling 12 (see FIGS. 1-6) or compressible material 90 (see FIGS. 7-13), the compressible material may contain a variety of materials and may be manufactured in a variety of ways as described by the manufacturing processes of FIGS. 14-16.

In the embodiment of FIG. 14, a non-conductive compressible material is coated with a conductive coating to provide a compressible conductive material. In the embodiment of FIG. 15, a method of making an inherently compressible conductive material is described. In the embodiment of FIG. 16, a method of impregnating a compressible material with a conductive constituent such as conductive filler is described.

FIG. 14 shows a manufacturing process 1000 for coating a compressible material with a conductive ink to make the compressible material conductive. Manufacturing process 1000 is used for coating a non-conductive fiberfill material. The manufacturing process 1000 is also used for coating non-conductive foam with a conductive material. In contrast to the other methods disclosed herein for compressible materials, here the material is coated with a conductive substance rather than being inherently conductive or being made conductive by adding a conductive filler. The coating process begins at step 1010 where a compressible material, such as fiberfill is selected. In one exemplary embodiment, the fiberfill is a polyester fiberfill such as Dacron® (a polyester fiber from Invista of Wichita, Kans.). In another exemplary embodiment, the fiberfill is Kodel® two ounce (2 oz.) fiberfill (from Eastman Kodak Co. of Rochester, N.Y.). The process continues at step 1012.

At step 1012, a coating is selected which will adhere to the fiberfill material or foam. In one preferred embodiment, a conductive coating known as Electrodag 820B (available from Acheson Colloids of Port Huron, Mich.) is selected. Electrodag 820B is particularly well suited for use with polyester fiberfills because of its adhesion to them. Moreover, a suitable fast-drying thinner is also selected that is compatible with the conductive coating and the filler material. The process continues at step 1014.

At step 1014, the coating is prepared for application by mixing about one (1) part conductive coating with about three (3) parts thinner. Thinner is added until the viscosity is about one thousand centipoise (1000 cp) or less. This allows the coating to flow around and through the fibers. When high density foam is used as the compressible material, the coating flows over the surface of the foam structure, without substantially penetrating it. When low-density foam is used, the coating flows through the interstices of the foam structure.

The use of fast-drying thinners reduces manufacturing time. The process continues at step 1016.

At step 1016, the compressible material is soaked (e.g., dipped or submerged within the prepared coating liquor) for approximately five (5) to approximately ten (10) minutes. By submerging fiberfill within the coating liquor, the coating substantially coats all fibers through the mass. Alternatively, the conductive coating is sprayed on the compressible material. For example, in one embodiment a carbon-based coating is sprayed on the fiberfill or foam/sponge material. Spraying the coating liquor reduces costs because it allows for a more focused application of the coating at areas adjacent to the traces or electrodes. However, spraying (as opposed to dipping) will typically reduce the sensitivity (e.g., the range of resistance change) of the pressure switch because only the conductive portion of the compressible material is responsive to compression.

When a non-porous sponge or foam is used, the density of the material and lack of passageways therethrough will keep the coating liquor from penetrating. Thus, the non-porous sponge or foam will have a surface coating only. This is different from the fiberfill that provides a surface coating to each fiber, but all the way through the fiber mass. The process continues at step 1018.

At step 1018, the coated compressible material is removed from the coating mixture and is allowed to dry. The fast-drying thinner quickly evaporates and allows the compressible material to air-dry. The process then ends. Following production of the coated compressible material, the material may be used in the assembly of switches described herein.

FIG. 15 shows a manufacturing process 1100 for making an inherently compressible conductive material 90. In general, a conductive material is added to a masterbatch and combined with the raw polymer before forming it into the desired structure (e.g., foam or fiberfill). The introduction of a conductive component into the masterbatch avoids the need for adding conductive coatings or interstitial fillers after the foam or fiberfill is made. The conductive components (e.g., silver powder) allow the fiber or foam itself to be conductive rather than requiring a coating or post-addition of an interstitial filler. Process 1100 begins at step 1102 where a masterbatch is made. A masterbatch is typically a concentrated mixture of additives (such as a conductive additive or filler) as well as pigments that are mixed with a resin for encapsulation. The mixture is then typically granularized allowing for transport, measuring, and addition to a raw polymer in a manufacturing process (e.g., spinning or foaming). The process then proceeds to step 1104.

At step 1104, a conductive additive, such as carbon or silver, is added to the masterbatch and is mixed thoroughly therethrough. For example, conductive additives include, but are not limited to, conductive powders or flakes, or metal fragments or filaments. More particularly, examples of conductive powders include silver powder and carbon powder. The process then proceeds to step 1106.

At step 1106, the masterbatch is combined with the raw polymer used to form the compressible material, which is then formed into fiber or foam, for example, by spinning or foaming, respectively. Spinning involves twisting separate filaments together to form a multi-filament fiber. The resulting fiber is typically much stronger than the individual filaments. Alternatively, a monofilament fiberfill comprising single fibers may be formed by feeding the melted & mixed raw polymer and masterbatch through a small hole. Foaming may be performed by a variety of methods. For example, polyurethane foam may be manufactured by adding volatile agents (e.g., blowing agents) to the mixture. In another example, foam may be produced by adding water to one of the liquid precursors of polyurethane before mixing. A reaction produces carbon dioxide bubbles that, along with the polyurethane, form a solid foam when polymerization is complete. The process then ends.

FIG. 16 shows a manufacturing process 1200 for making a compressible material impregnated with a conductive filler. Typically, a conductive powder or small conductive fibers are added to a fibrous material or open-cell foam to make it conductive. Alternatively, a carbon suffusion process may be used to chemically saturate the fiber. The carbon particles are introduced to the fiber and become part of the structure. The carbon particles, being conductive, make the fibers conductive proximate their outer surface. A conductive fiber formed from a carbon suffusion process may be purchased as Resistat® or Sanstat® available from Shakespeare Company, LLC of Columbia, S.C. The process 1200 begins at step 1202 where a non-conductive fiber is selected and added to a mixer. The process then proceeds to step 1204.

At step 1204, a conductive component is added to a non-conductive compressible material. The non-conductive fiber or foam are already produced and are mixed thoroughly with the conductive components. The conductive components may be inherently conductive fibers, fibers coated with a conductive substance, metal fibers, metal powder, carbon powder, carbon fibers, etc. The process then ends.

Figure 17:
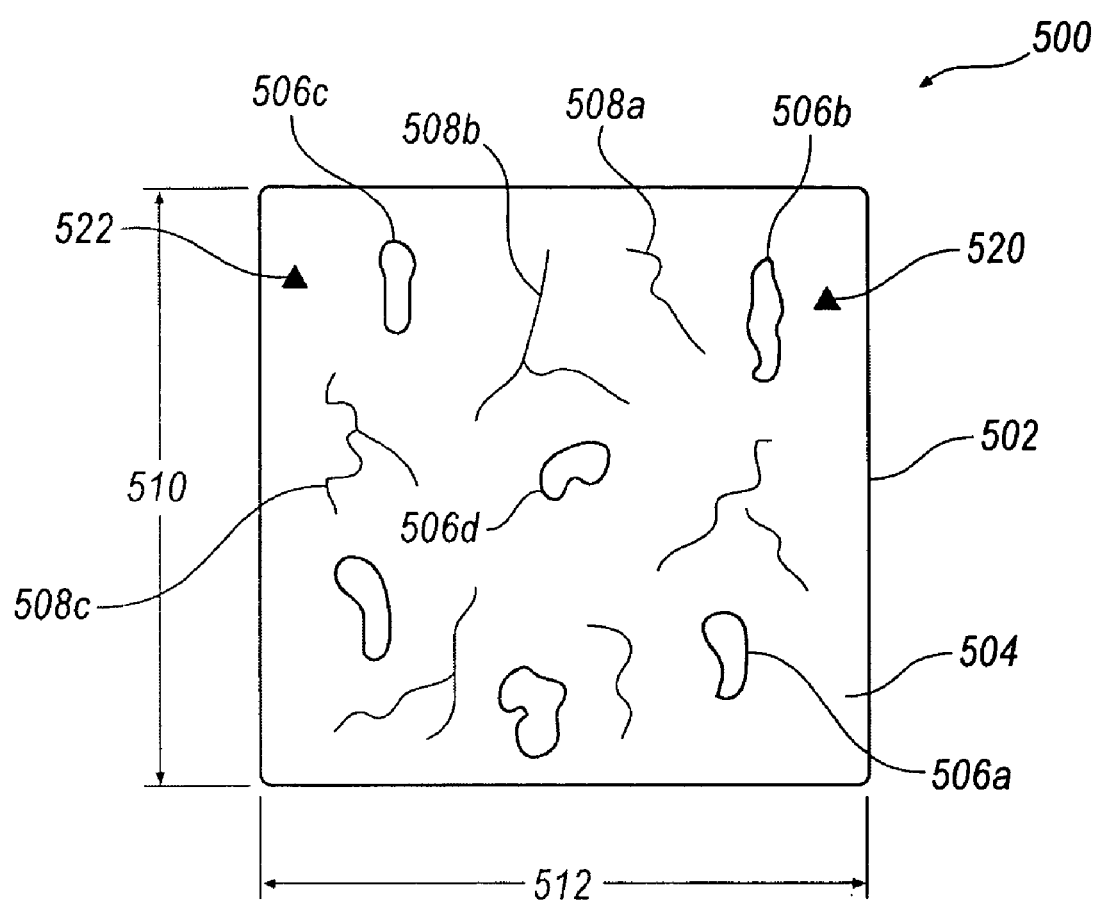
FIG. 17 shows a surface of a conductive coated foam in a relaxed condition.

As mentioned previously, in certain embodiments of the pressure responsive sensors described herein, compression of the sensor causes resistance to increase. An embodiment of this type of sensor is illustrated in FIG. 17. Referring to the figure, a coated foam 500 is shown in a relaxed condition. Foam 502 has a conductive coating that is applied to its surface. The coating does not penetrate through the thickness of foam 500, except to a small penetration depth from the surface. In one embodiment, the coating thickness is about two microns (2µ). The coating is preferably applied such that when a compressive force is applied to coated foam 500, discontinuities or cracks in the coated surface occur, thereby reducing the conductive surface area and increasing the resistance of coated foam 500. In contrast, foams that comprise a conductive coating through their thickness will experience a decrease in resistance on compression because more of the conductive particles dispersed in the coating are brought into contact with one another. Referring again to FIG. 17, in a relaxed condition, e.g. non-compressed and non-stretched, foam 502 has a coating 504 and has first surface dimensions 510 and 512.

A resistance of coating 504 is determined primarily by the materials of the conductive coating and the thickness of the coating. The resistance, in this example, is measured from measurement points 520 and 522. Although coating 504 includes voids 506 and cracks 508, the coating nonetheless presents a resistance at measurement points 520 and 522 because there is a current path between them in the non-broken regions of coating 504. In an embodiment, the resistance of coating 504 at rest (e.g., the relaxed condition) is about five kilo-ohms (5 kΩ). In addition, coating 504 may be applied so that there are substantially no cracks 508 or voids 506 when foam 502 is in the relaxed state. Where a silver-based conductive coating is used (or other highly conductive element) the resistance at rest is about 1 milliohm (1 mΩ).

Figure 18:
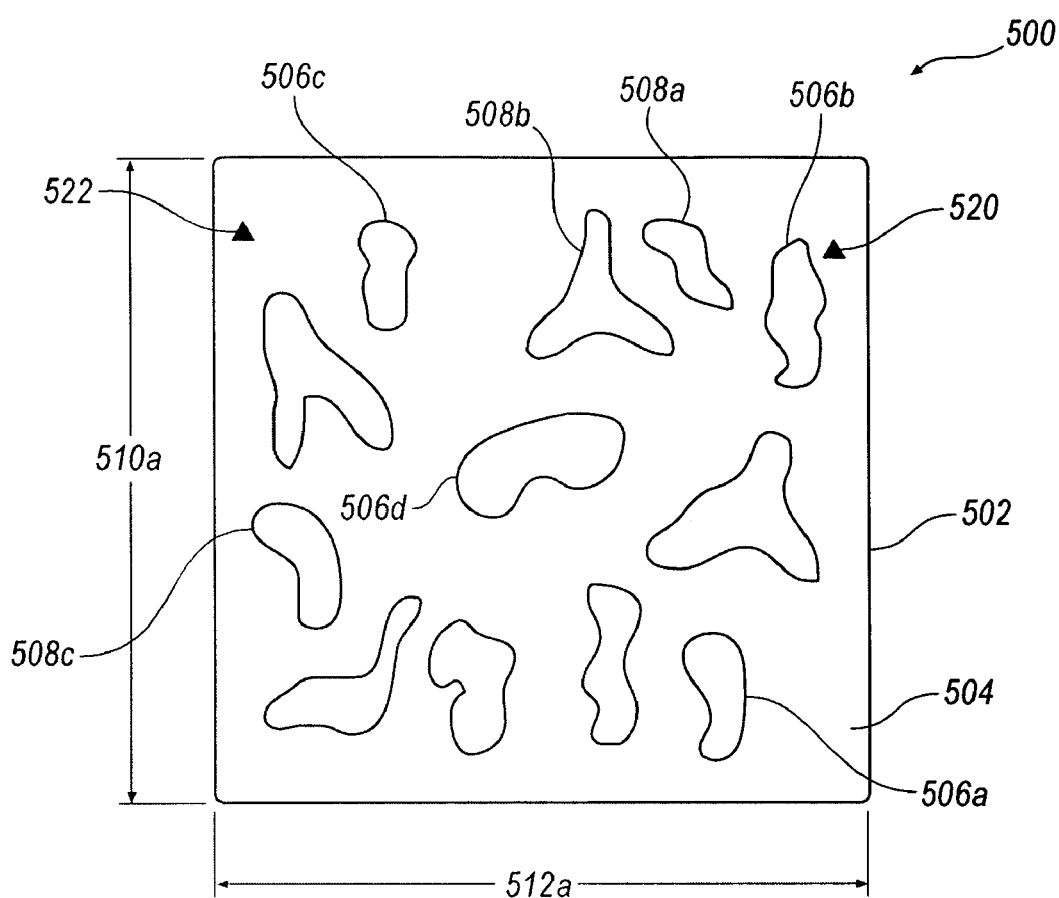
FIG. 18 shows a surface of a conductive coated foam in a distorted condition.

FIG. 18 shows conductive coated foam 500 in a distorted condition. By distorting or stretching foam 502, the coating surface dimensions are increased and foam 502 and coating 504 have a second surface dimension 510*a* and second surface dimension 512*a* that are both greater than first dimensions 510 and 512. A force applied to foam 500 may cause the distortion of the surface. Such distortion may be caused, for example, by a compressive force applied to a foam (see force 302 of FIG. 13). The force causes the foam to compress along the direction of the force, but the surface coating 504 would stretch or distort due to the lateral expansion of the foam. In another example, surface coating 504 may be applied to a pillow casing. In this example, a localized force (e.g., a user's head resting on the pillow) would cause a local distortion of the pillow casing. At least where the force interacts with the pillow casing, coating 504 will be distorted.

As a result of coating 504 being distorted, e.g. stretched over a larger area, the voids 506 and cracks 508 are stretched to larger proportions. In other words, by the distortion or stretching of coating 504, the voids become larger and the cracks become separated. The resulting increase of discontinuities in coating 504, the thinning of coating 504, and increased distance between measurement points 520 and 522 yield an overall increase in resistance. In this way, a circuit connected at measurement points 520 and 522 is able to detect a distortion of coating 504 and may interpret the distortion as pressure applied to foam 502 that stretches or compresses coating 504. In an embodiment, when the surface area of coating 504 is doubled in the distorted configuration, the resistance is about one meg-ohms (1 MΩ) between measurement points 520 and 522, as opposed to about five kilo-ohms (5 kΩ) between measurement points 520 and 522 in the relaxed configuration. In an embodiment where a carbon ink is used for coating 504, the relaxed resistance is about fifty ohms (50Ω). Alternatively, where a silver ink is used, the relaxed resistance is about 1 milliohm (1 mΩ). Measurement points 520 and 522 may, in an embodiment, comprise silver traces or pads printed upon or under coating 504. With the use of external circuitry, such as that described in FIG. 5, the resistance of coating 504 may be used to determine the amount of distortion present.

In another embodiment, a coating 504 may comprise two-layers, including a carbon lower layer and a silver upper layer. The lower carbon layer, as compared with the upper silver layer, provides conductivity over a wide range of distortion. In comparison, the silver upper layer may become an open circuit (e.g., having substantially infinite resistance) when highly distorted. In this way, a measurement of the distortion of coating 504 is improved because an open-circuit will not occur over the entire coating 504 unless the lower carbon layer is distorted beyond its limits. When distortion occurs such that the upper silver layer is an open circuit, the lower carbon layer remains conducting and thus, provides an indication to a circuit that the pressure sensor is still at least connected.

In another embodiment, coating 504 may be a trace printed on a surface rather than a coating that substantially covers a surface. In yet another embodiment, coating 504 may be a multi-layer trace that preferably includes a carbon lower layer and a silver upper layer.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. The embodiments should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

With regard to the processes, methods, heuristics, etc. described herein, it should be understood that although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes described herein are provided for illustrating certain embodiments and should in no way be construed to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. A sensor comprising:
   a loose assemblage of individual fiber filaments having an electrically conductive coating; and
   at least two electrodes in electrical communication with said fiber filaments, wherein the loose assemblage of individual fiber filaments has an electrical resistance which changes when it is compressed,
   wherein the loose assemblage of individual fiber filaments comprises fiberfill.

2. The sensor of claim 1, wherein said at least two electrodes are printed upon at least one substrate.

3. The sensor of claim 2, wherein said at least one substrate is flexible.

4. The sensor of claim 2, wherein said substrate is selected from the group consisting of a woven fabric, a non-woven fabric, a mesh, a sheet, and a plastic.

5. The sensor of claim 1, wherein said coating comprises a resin having an electrically conductive material dispersed therein, and the resin electrically conductive material adheres to said fiber filaments.

6. The sensor of claim 1, wherein the fiberfill has a compressed volume and an uncompressed volume, and the ratio of the uncompressed volume to the compressed volume is at least about 1.5:1.

7. The sensor of claim 6, wherein the ratio of the uncompressed volume to the compressed volume is at least about 5:1.

8. The sensor of claim 1, wherein said changes in the electrical resistance of said loose assemblage of individual fiber filaments indicate the magnitude of said compression.

9. The sensor of claim 2, wherein said two electrodes are located on the same surface of said substrate.

10. The sensor of claim 9, wherein said two electrodes do not overlap in plan view.

11. The sensor of claim 9, wherein said two electrodes are located opposite one another.

12. A sensor comprising:
a loose assemblage of individual fiber filaments having an electrically conductive coating;
at least two electrodes in electrical communication with said fiber filaments, wherein the loose assemblage of individual fiber filaments has an electrical resistance which changes when it is compressed; and
a resilient non-conductive region partially surrounding said loose assemblage of individual fiber filaments.

13. The sensor of claim 12, wherein said resilient non-conductive region is selected to provide a predetermined relationship between an applied compressive force and the amount of compression of said loose assemblage of individual fiber filaments.

14. A vehicle seat, comprising the sensor of claim 1.

15. The sensor of claim 1, further comprising a pouch that contains said loose assemblage of individual fiber filaments.

16. A sensor comprising:
a loose assemblage of individual fiber filaments having an electrically conductive coating; and
at least two electrodes in electrical communication with said fiber filaments, wherein the loose assemblage of individual fiber filaments has an electrical resistance which changes when it is compressed,
wherein said loose assemblage of individual fiber filaments is at least partially protected by a moisture-resistant covering.

17. A comforter comprising at least one sensor of claim 1.

18. A sensor comprising:
a compressible material with an electrically conductive coated surface, wherein the electrically conductive coating on said surface penetrates only a small depth of said material;
at least two electrodes in electrical communication with said surface, said surface having an electrical resistance between said at least two electrodes, wherein compression of said compressible material causes the electrical resistance to increase; and
a button retaining said compressible material and selected to provide a predetermined relationship between an applied compressive force and the amount of compression of said compressible material.

19. A sensor comprising:
a compressible material with an electrically conductive coated surface, wherein the electrically conductive coating on said surface penetrates only a small depth of said material;
at least two electrodes in electrical communication with said surface, said surface having an electrical resistance between said at least two electrodes, wherein compression of said compressible material causes the electrical resistance to increase;
a button, wherein when a compressive force is applied to the button, the button compresses the compressible material;
an illumination source turned on and off by operation of said button; and
a light guide guiding light from said illumination source.

20. A sensor comprising:
a compressible material with an electrically conductive coated surface, wherein the electrically conductive coating on said surface penetrates only a small depth of said material; and
at least two electrodes in electrical communication with said surface, said surface having an electrical resistance between said at least two electrodes, wherein compression of said compressible material causes the electrical resistance to increase,
wherein said compressible material is at least partially covered by a moisture-resistant material.

\* \* \* \* \*